T. V. BUCKWALTER.
VEHICLE.
APPLICATION FILED FEB. 3, 1908.

914,111.

Patented Mar. 2, 1909.

WITNESSES:
Robt P Kitchel
Jos. G. Denny Jr.

INVENTOR
Tracy V. Buckwalter
BY
Charles N. Butler
ATTORNEY.

UNITED STATES PATENT OFFICE.

TRACY V. BUCKWALTER, OF ALTOONA, PENNSYLVANIA.

VEHICLE.

No. 914,111.  Specification of Letters Patent.  Patented March 2, 1909.

Application filed February 3, 1908. Serial No. 413,931.

*To all whom it may concern:*

Be it known that I, TRACY V. BUCKWALTER, a citizen of the United States, residing at Altoona, in the county of Blair and State of Pennsylvania, have invented certain Improvements in Vehicles, of which the following is a specification.

This invention relates primarily to improvements in vehicles of the motor driven type in which a frame carried by the traction wheels supports a body for the carriage of passengers, and its leading purpose is to reduce to a minimum the transmission of jars, vibrations and strains from the wheels and frame to the body, to render travel more comfortable and reduce deterioration.

It is desirable for stability to use a solid frame having four points of support, but the twisting and weaving to which such frames are subjected by the transmission of shocks through the wheels from irregularities in their path cause the rapid impairment and destruction of bodies supported thereon as in existing constructions.

In the preferred form of my invention, I use a solid frame, having four points of support, with a body having three points of support located in or, in the region of the longitudinal and transverse axial planes of the frame, where vibration is at a minimum.

Figure 2:
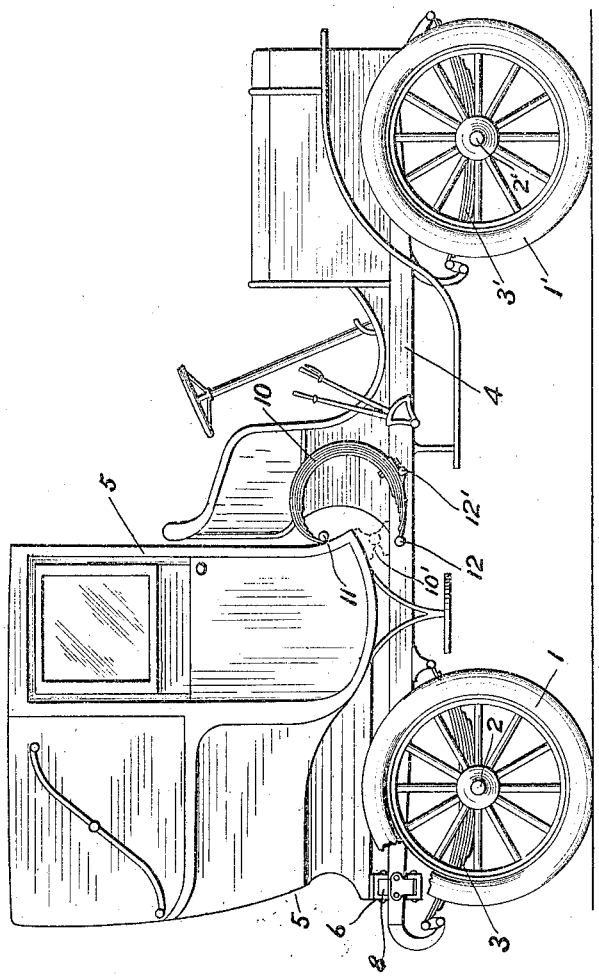
Figure 1:
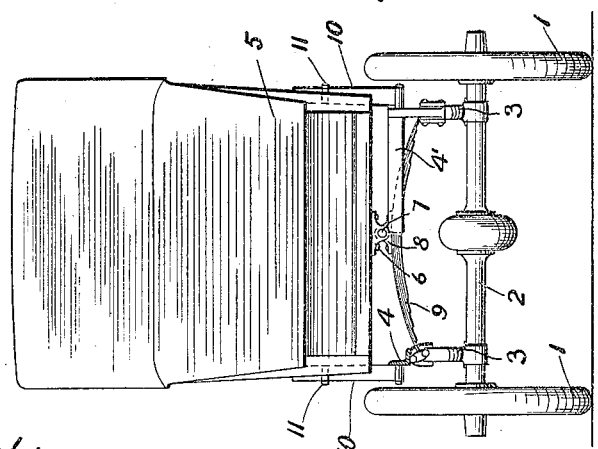

In the accompanying drawing, Figure 1 represents a rear view of a motor cab embodying the improvements, and Fig. 2 represents a side elevation thereof.

The vehicle illustrated has the pairs of traction wheels 1 and 1' respectively connected by the axles 2 and 2'. The axles carry the longitudinally disposed springs 3 and 3' which are connected with the respective ends of the side bars 4 of the frame, the latter being composed preferably of angle irons. The body 5 has the bearing 6 secured to the middle of its rear and pivotally connected by the pintle 7 to the bearing 8 secured to the frame by fixing it to the middle of either the cross bar 4' connecting the side bars or the cross spring 9 connected with the side bars.

Struts 10, either rigid or resilient, have the connections 11 with the body and the connections 12 and 12' with the side bars of the frame in the vicinity of the middle thereof. In place of the struts 10, pivotal connections 10', shown in dotted lines, may be used for carrying the weight of the forward part of the body to the side bars. The body thus has three points of support, carried by the frame either through rigid or spring connections, disposed in or in the region of the frame's longitudinal and transverse axial planes, where there is least motion and shock resulting from irregularities or obstacles encountered by the wheels, by which the body escapes in great measure the jars, vibrations and strains communicated to the frame members.

Having described my invention, I claim:

1. A vehicle having a frame and a body carried by said frame through a rear pivotal-point of support approximately in the longitudinal axis of said frame and forward points of support at approximately the middle of the length of said frame.

2. A vehicle having a frame with four points of support, a body, and means for supporting said body on said frame, said means comprising a central pivotal connection with the rear of said body and rocking connections with the forward part of said body.

3. A vehicle having four wheels, a frame having side bars, means comprising springs whereby the respective ends of said side bars are supported by said wheels, and a body carried by said frame, said body having the rear thereof supported by a connection adapted to rock on an axis extending in the direction of the length of said frame and having the forward part thereof supported by connections adapted to rock on an axis transverse to said axis first named.

4. A vehicle having four wheels, a frame carried by said wheels, a body, a pivotal support connecting the rear of said body with said frame so as to permit said body to rock transversely and elastic supports connecting the forward part of said body with the sides of said frame.

In witness whereof I have hereunto set my name this 30th day of January, 1908, in the presence of the subscribing witnesses.

TRACY V. BUCKWALTER.

Witnesses:
J. T. B. BUCK,
P. H. MARKLEY.